US 6,697,679 B2

(12) United States Patent
Hatakeyama

(10) Patent No.: US 6,697,679 B2
(45) Date of Patent: Feb. 24, 2004

(54) OPTION-IDENTIFYING SYSTEM

(75) Inventor: Motonobu Hatakeyama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 586 days.

(21) Appl. No.: 09/741,795

(22) Filed: Dec. 22, 2000

(65) Prior Publication Data

US 2002/0015184 A1 Feb. 7, 2002

(30) Foreign Application Priority Data

Dec. 24, 1999 (JP) ............................................ 11-366372

(51) Int. Cl.$^7$ .............................. G06K 1/00; G06F 3/12
(52) U.S. Cl. .......................... 700/13; 700/226; 271/8.1; 358/1.15; 399/393
(58) Field of Search ............................... 700/8, 13, 114, 700/226; 271/8.1, 9.01, 9.02, 9.03, 9.04, 9.05, 9.06; 358/1.12, 1.13, 1.15, 1.16; 399/76, 77, 82, 124, 388, 393

(56) References Cited

U.S. PATENT DOCUMENTS 6,545,766 B1 * 4/2003 Shima et al. .......... 358/1.15 X

2001/0007619 A1 * 7/2001 Kakutani
2003/0048474 A1 * 3/2003 Hong et al. ................ 358/1.15

* cited by examiner

Primary Examiner—Emanuel Todd Voeltz
(74) Attorney, Agent, or Firm—Rabin & Berdo, P.C.

(57) ABSTRACT

An option-identifying system identifies the locations of a plurality of options that are electrically connected in cascade and mounted to a main body such that the options are attachable to and detachable from the main body. The main body outputs a location-assigning signal having a plurality of bits to a first one of the plurality of options. Each option tray has a data-storing section and a location-identifying section. The data-storing section stores the locations of the plurality of options and corresponding location data that describes the locations. The location-identifying section receives the location-assigning signal and compares the received location-assigning signal with the location data to identify a location of a corresponding option. The location-identifying section changes the logic level of at least one bit of the received location-assigning signal or changes the number of bits of the received location-assigning signal, then outputs to a immediately lower option tray.

7 Claims, 17 Drawing Sheets

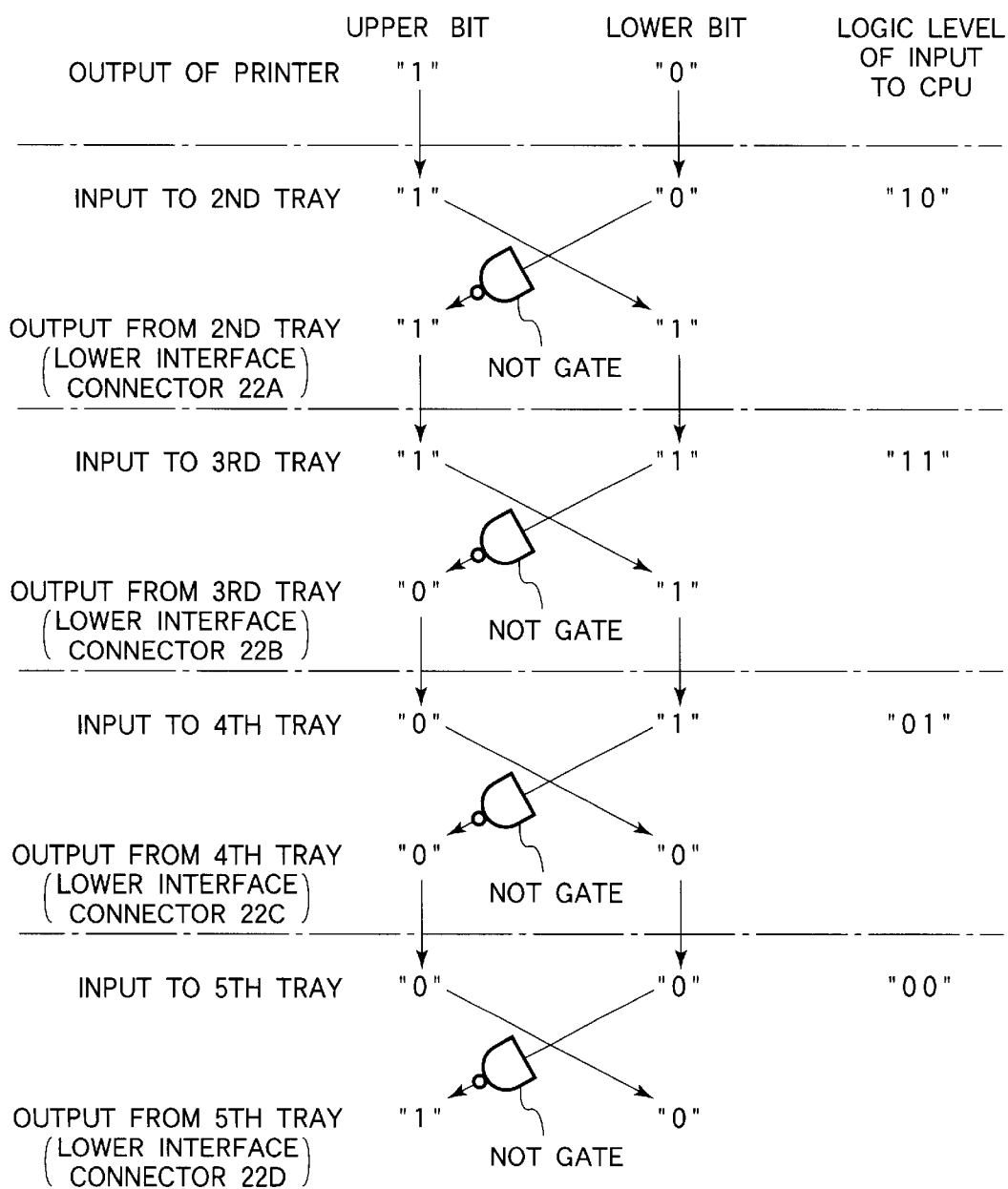

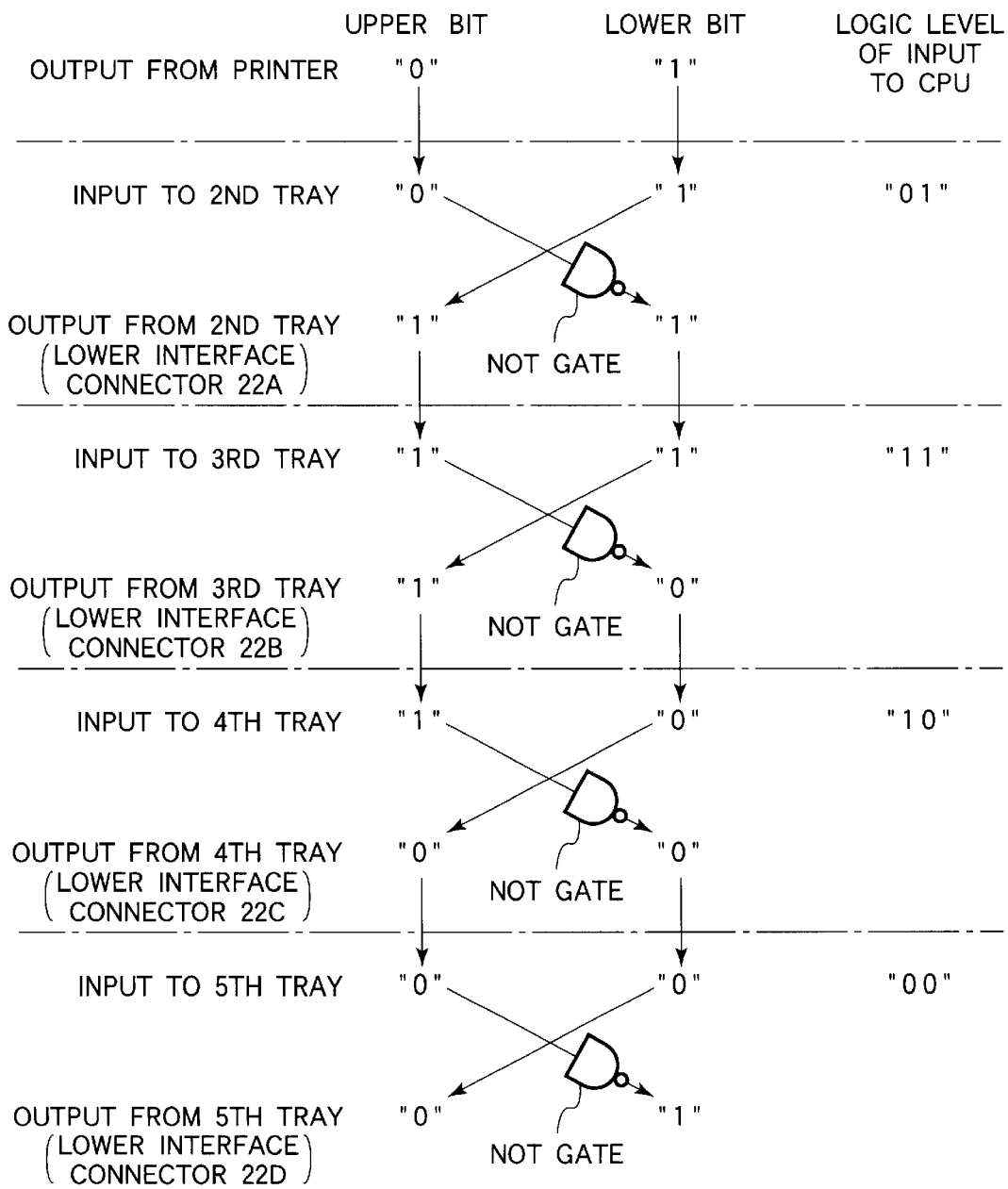

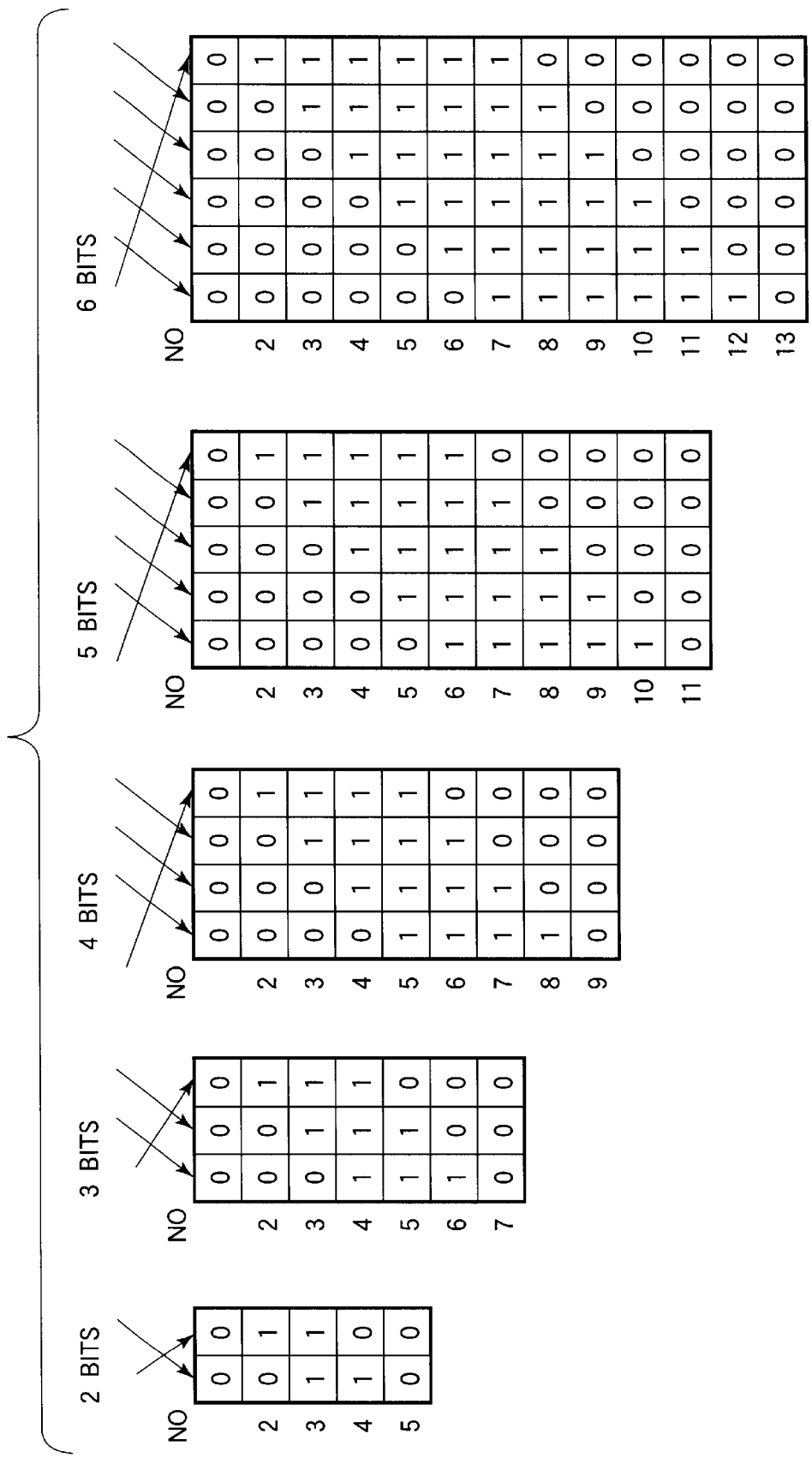

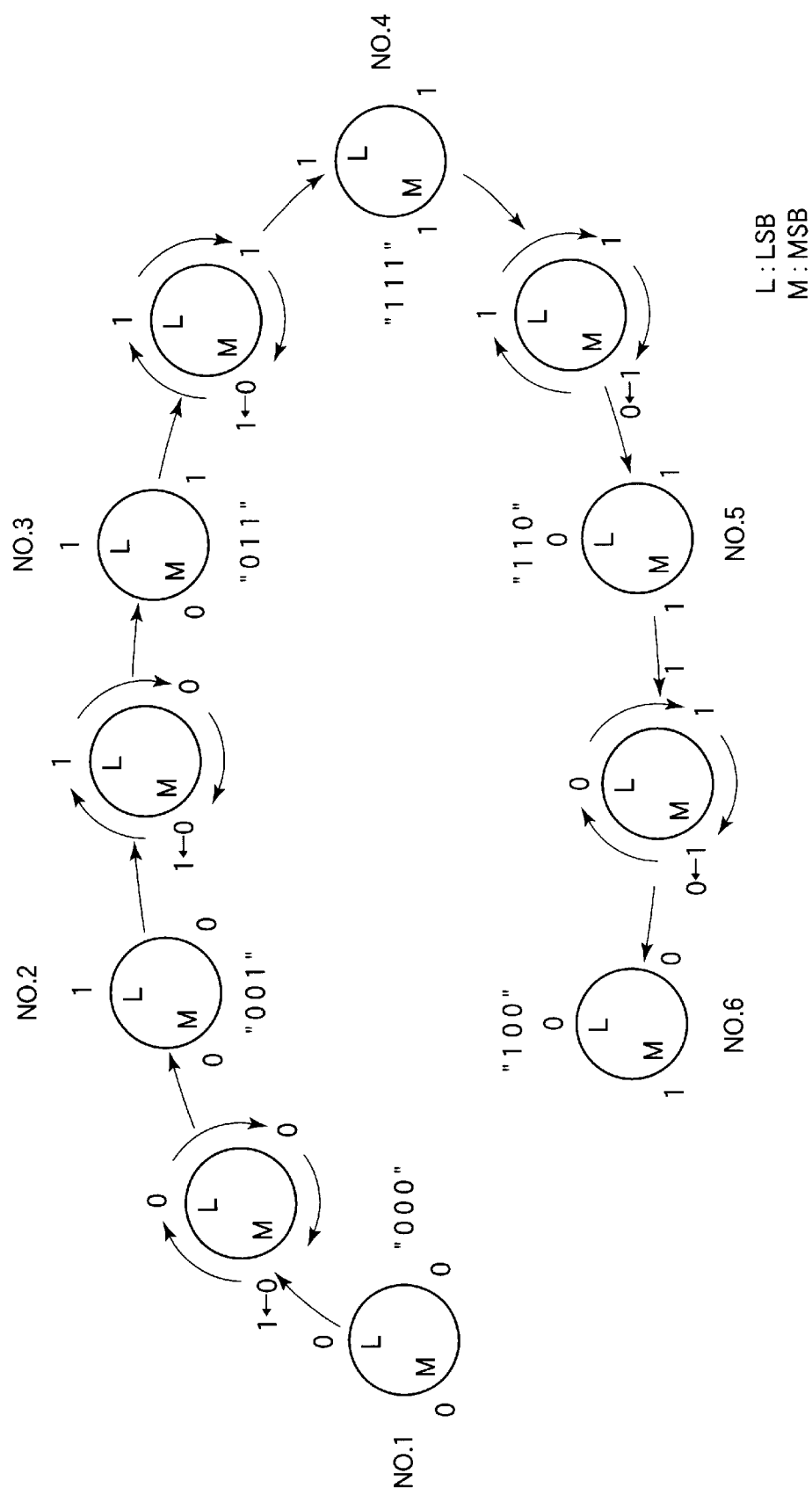

CONVENTIONAL ART

CONVENTIONAL ART

OPTION-IDENTIFYING SYSTEM

BACKGROUND OF THE INVENTION

1. Field of the Invention

The present invention relates to an option-identifying system that identifies the locations of optional devices such as paper trays used in an electrophotographic printer, the optional devices being in a stacked configuration, inserted into the printer. The present invention also relates to a method where a host apparatus identifies the locations of one or more low optional devices electrically connected to the host apparatus and the low individual low optional devices can also identify their locations. The present invention also relates to a system in which the host apparatus individually communicates control signals with the respective low optional devices.

2. Description of the Related Art

Printers and copying machines are provided with option paper trays that hold paper of different sizes and orientation are detachable from and attachable to the main body.

{Operation for Assigning Locations to Option Trays}

FIG. 17 illustrates conventional option trays when they are inserted into a printer.

Referring to FIG. 17, a printer 100 incorporates a printer controller 101 and an option tray interface connector 102. Optional trays 200A and 200B have an upper interface connector 201A and 201B and lower interface connectors 202A and 202B, projections 203A and 203B, detection switches 204A and 204B, and tray controllers 205A and 205B.

The printer controller 101 controls the overall operation of the printer 100 including the option trays 200A and 200B. The printer controller 101 communicates various signals with the option tray 200A over a serial signal transmit/receive line 400. The serial signal transmit/receive line is connected to the option tray controller 205A of the upper option tray 200A via the option interface connector 102 of the printer 100 and the upper interface connector 201A of the upper option tray 200A.

The transmit/receive line 300 is further connected through the lower interface connector 202A of the option tray 200A with the upper option tray 200B. The stacked option trays 200A and 200B are of the same configuration. The printer 100 usually incorporates a standard tray, not shown, therein. Thus, a tray (i.e., 200A) located immediately under the standard tray is usually referred to as the 2nd tray and a tray (i.e., 200B) next to the 2nd tray is referred to as the 3rd tray.

The option trays 200A–200B have upright projections 203A–203B such that when the option trays 200A–200B are stacked, the projection 203B fits to the immediately upper option tray 200A to push a detection switch 204A provided on the immediately upper option tray 200A. The detection switches 204A–204B are connected to the option tray controllers 205A–205B.

The option tray controller recognizes that a corresponding option tray is at the location of the 2nd option tray if the detection switch is pushed. The option tray controller recognizes that a corresponding option tray is at the location of the 3rd option tray if the detection switch is not pushed.

In this manner, the option tray controller 205 of an option tray determines where the option tray is located. Then, when the printer controller 101 receives a print command from a host computer, not shown, the printer controller 101 sends a paper-feed command over the transmit/receive line 300 to the option trays 200A and 200B simultaneously under a predetermined protocol.

The paper-feed command include, for example, information on the location of a corresponding option tray that holds print medium of the size, type, and orientation specified by the print command. The option tray controller makes a check to determine whether the received location information matches the one assigned to the option tray. If they do not coincide with each other, then the option tray controller will simply ignore the location information. If they coincide with each other, then the option tray controller causes a feed motor and a paper sensor, not shown, to operate in order to feed print paper to the printer 100, thereby initiating a printing operation.

However, the conventional printer 100 of the aforementioned construction suffers from the problem that only up to two stacked option trays can be identified. When three or more of the option trays are stacked, all of the detection switches 204A–204B of the stacked option trays except for the detection switch 204B of the bottom option tray will be pushed. As a result, only the bottom option tray can be identified. One way of solving this drawback is to employ a DIP switch in each option tray and set the DIP switch in accordance with the location of the option tray. However, this requires the user to remember the setting of the DIP switch and the location to which the DIP switch is set.

This conventional configuration also suffers from the problem that if the user does not remember the setting of the DIP switch or the user makes a mistake when setting the DIP switch, the paper is not fed from the right option tray.

{Operation of the Printer Controller}

FIG. 18 is a flowchart showing the operation of the printer controller in which a check is made to determine whether option trays are present or absent.

At step S501, the printer controller 101 sends a SW-OFF inquiring command to the option trays over the serial transmit/receive line 300. The SW-OFF inquiring command is a command that inquires the option trays whether their detection switches are in the off-state.

At step S502, shortly after the transmission of the command, the printer controller 101 starts to count an elapsed time. If the printer controller 101 does not receive a reply from any one of the option trays over the transmit/receive line 300 before the printer controller 101 has counted time up to a predetermined time length, then the printer controller 101 stores data "2ND=ABSENT" and "3RD=ABSENT" at step S508.

At step S503, if the printer controller 101 receives a SW-OFF reply from one of the option trays over the transmit/receive line 300, then the printer controller 101 sends at step S504 a SW-ON inquiring command to the option tray over the transmit/receive line 300. The SW-OFF reply indicates that the detection switch is in the off-state. The SW-ON inquiring command is a command that inquires whether the detection switches of the option trays are in the on-state. If the printer controller 101 does not receive at step S505 a SW-OFF reply from the option trays over the transmit/receive line 300 before the printer controller 101 has counted up to a predetermined time length, then the printer controller 101 stores at step S509 data "2ND=OFF" and "3RD=ABSENT" at step S510.

If the printer controller 101 receives a SW-ON reply from one of the option trays over the transmit/receive line 300 at step S506, the printer controller 101 stores at step S507 "2ND=ON" and "3RD=OFF" at step S510.

{Operation for Determining Whether Option Trays are Present or Absent}

FIG. 19 illustrates the operation for determining whether option trays are present or absent.

At step 511, the option trays receive the presence/absence polling command over the transmit/receive line 300. The presence/absence polling command is a command to inquire whether a specified option tray is present.

At step S512, the respective option trays determine whether the received command is the presence/absence polling command. If the answer at step S512 is YES, then the option trays read the state of their own detection switches at step S513. If the answer at step S512 is NO, then the program proceeds to step S516 where other command is executed.

At step S514, if the state of the switch of one of the option trays matches the presence/absence polling command, then the option tray reads the state of its own detection switch.

At step S515, the option tray sends at step a PRESENCE reply to the printer controller over the transmit/receive line 515. The PRESENCE reply indicates that the inquired option is actually present. If the answer is NO at step S514, the received presence/absence polling command is simply ignored and the program ends.

{Operation of Acquiring the Status of the Option Tray}

The printer controller 101 has a table which lists switch data of the individual option trays obtained by the operation of checking whether option trays are present or absent. The printer controller 10 reads from the table the switch data for an option tray to be specified. The printer controller 101 then sends the switch data together with an option status polling command to the option tray over the transmit/receive line 300.

A check is made at each option tray to determine whether the received switch data matches the one stored in the option tray. If the answer is YES, then the option tray sends status data that describes the print medium accommodated in the option tray to the printer controller 101 over the transmit/receive line 300. The information regarding the print medium includes the size, type, orientation, and presence and absence of the print medium. If the received switch data does not match the one stored in the option tray, then the option simply ignores the switch data and option status polling command. The printer controller 101 receives the status data from the option tray and stores it therein.

{Printing Operation}

Upon receiving a print command from a host apparatus, the print controller 101 determines, based on the status data, an option tray that meets the conditions selected by the user. Then, over the serial transmit/receive line 300, the printer controller 101 reads the switch data of the option tray specified by the user therefrom, and sends the switch data to the option tray over the transmit/receive line 300. The option tray receives the switch data from the print controller 101 over the serial transmit line 40. If the switch data matches the one stored in the option tray, the option tray feeds a print medium therefrom in accordance with the paper-feed command. If the switch data does not match the one stored in the option tray, then the option tray ignores the paper-feed command. In this manner, a page of print medium is fed from the specified option tray.

SUMMARY OF THE INVENTION

The present invention was made in view of the aforementioned drawbacks.

An option-identifying system identifies the locations of a plurality of options that are electrically connected in cascade and mounted to a main body such that the options are attachable to and detachable from the main body. The main body has a signal generating section that outputs a location-assigning signal having a plurality of bits to a first one of the plurality of options. Each of the plurality of options has a data-storing section and a location-identifying section. The data-storing section stores the locations of the plurality of options and corresponding location data that describes the locations. The location-identifying section receives the location-assigning signal and compares the received location-assigning signal with the location data to identify a location of a corresponding option. The location-identifying section inverts one of the plurality of bits of the received location-assigning signal, then rotates the plurality of bits of the location-assigning signal after inversion of the most significant bit, and finally outputs the location-assigning signal after rotation to a following option.

Another option-identifying system identifies the locations of a plurality of options that are electrically connected in cascade and mounted to a main body such that the options are attachable to and detachable from the main body. The main body has a signal-generating section that outputs a location-assigning signal having a plurality of bits to a first one of the plurality of options. Each of the plurality of options has a data-storing section and a location-identifying section. The data-storing section stores the locations of the plurality of options and corresponding location data that describes the locations. The location-identifying section receives the location-assigning signal and compares the received location-assigning signal with the location data to identify a location of a corresponding option. The location-identifying section outputs the location-assigning signal having a number of bits different from the received location-assigning signal to a following option. The option identifying section may output the location-assigning signal having one more bit or less bit than in the received location-assigning signal to the following option.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 3 illustrates the location table stored in the memory;

FIG. 4 illustrates the transition of logical state of the location-assigning signal according to the first embodiment;

FIG. 5 illustrates the location table stored in the memory;

FIG. 6 illustrates the transition of logical state of the location-assigning signal;

FIG. 7 illustrates a plurality of bits and locations represented by the plurality of bits;

FIG. 8 illustrates the transition of logic level of bits when the entire pulse train of the location-signal of the location-assigning signal having three bits is rotated;

DETAILED DESCRIPTION OF THE INVENTION

The present invention will be described in detail by way of example.

First Embodiment

{Construction}

Figure 1:
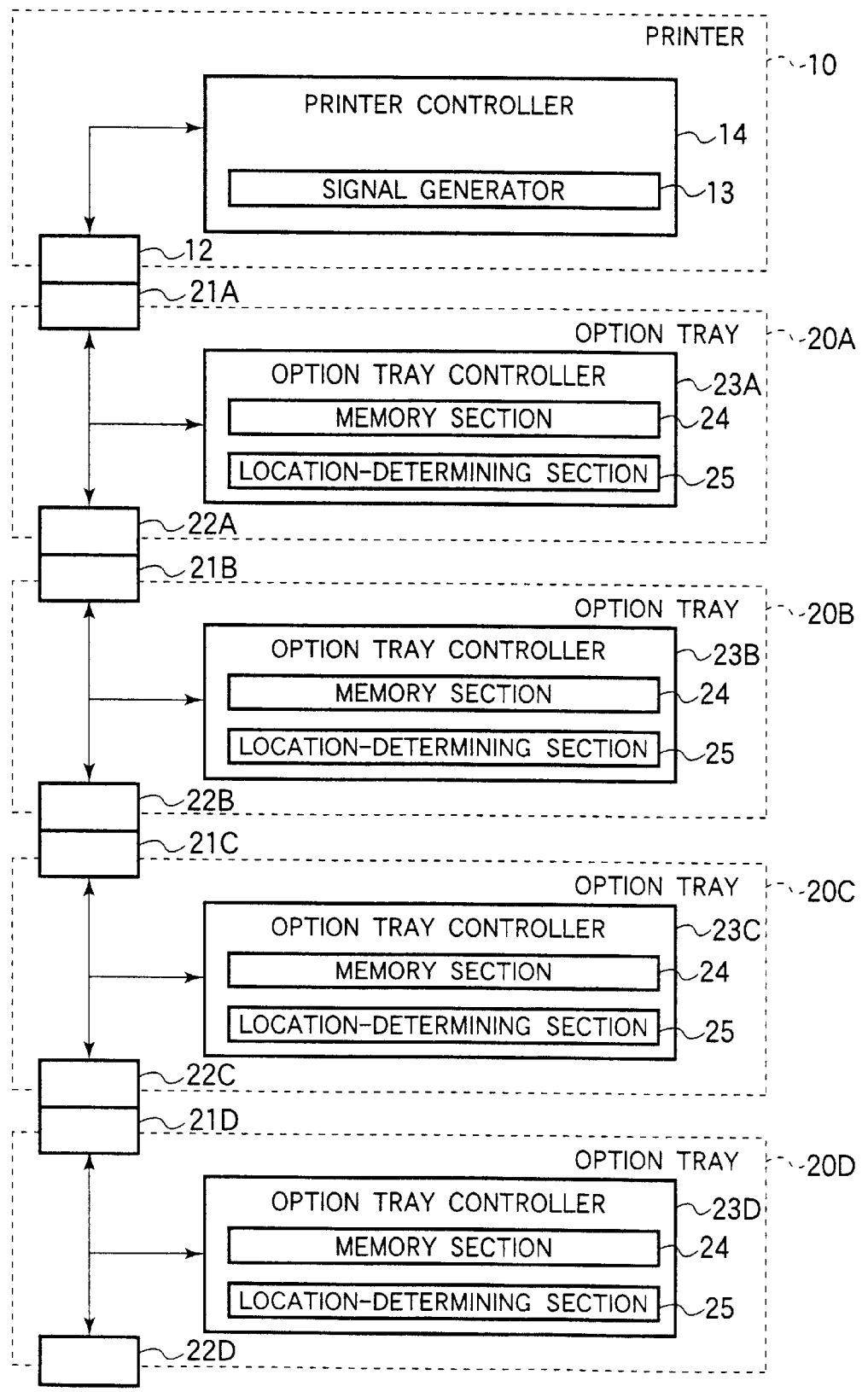
FIG. 1 illustrates a first embodiment of an option tray-identifying system.

FIG. 1 illustrates a first embodiment of an option tray-identifying system.

The option tray-identifying system according to the first embodiment includes a printer 10 and four option trays 20.

The printer 10 incorporates a printer controller 14 and an option tray interface connector 12 therein. The printer controller 14 has a signal generator 13 that generates a location-assigning signal. Option trays 20A–20D are provided with upper interface connectors 21A–21D, lower interface connectors 22A–22D, and option tray controllers 23A–23D, respectively. The option tray controllers 23A–23D incorporates location-determining sections 25A–25D and memory sections 24A–24D that store the locations of corresponding option trays, respectively.

The signal generator 13 generates the location-assigning signal in the form of a multi-bit signal, e.g., two-bit signal in the first embodiment.

The printer controller 14 has an option tray interface connector 12 fitted to the upper interface connector 21A of the option tray 20A located immediately under the printer 10. The option tray controller 23A of the option tray 20A is connected to a corresponding lower interface connector 22A, which in turn is connected to the upper interface connector 21B of the next lower option tray 20B.

The memory section 24 (memory 232 of FIG. 2) stores a plurality of items of multi-bit data, i.e., location data LOCATION that describe different locations of the individual option trays 20A–20D. The location-determining section 25 of each option tray receives a location-assigning signal from the printer 10 or an immediately upper option tray, and compares the received location-assigning signal with the plurality of items of location data LOCATION stored in the memory section 24 to determine the location of the corresponding option tray. The location-determining section 25 inverts one of the bits of the received location-assigning signal, then changes the positions of the bits of the location-assigning signal after inversion, and finally sends the location-assigning signal whose bits positions have been changed to an immediately lower option tray.

The option trays 20A–20D are of the same configuration. The configuration of the first embodiment differs from the conventional apparatus in the location-determining means. The configuration and operation of the first embodiment, including a paper-feeding operation, are much the same as the conventional apparatus.

Figure 2:
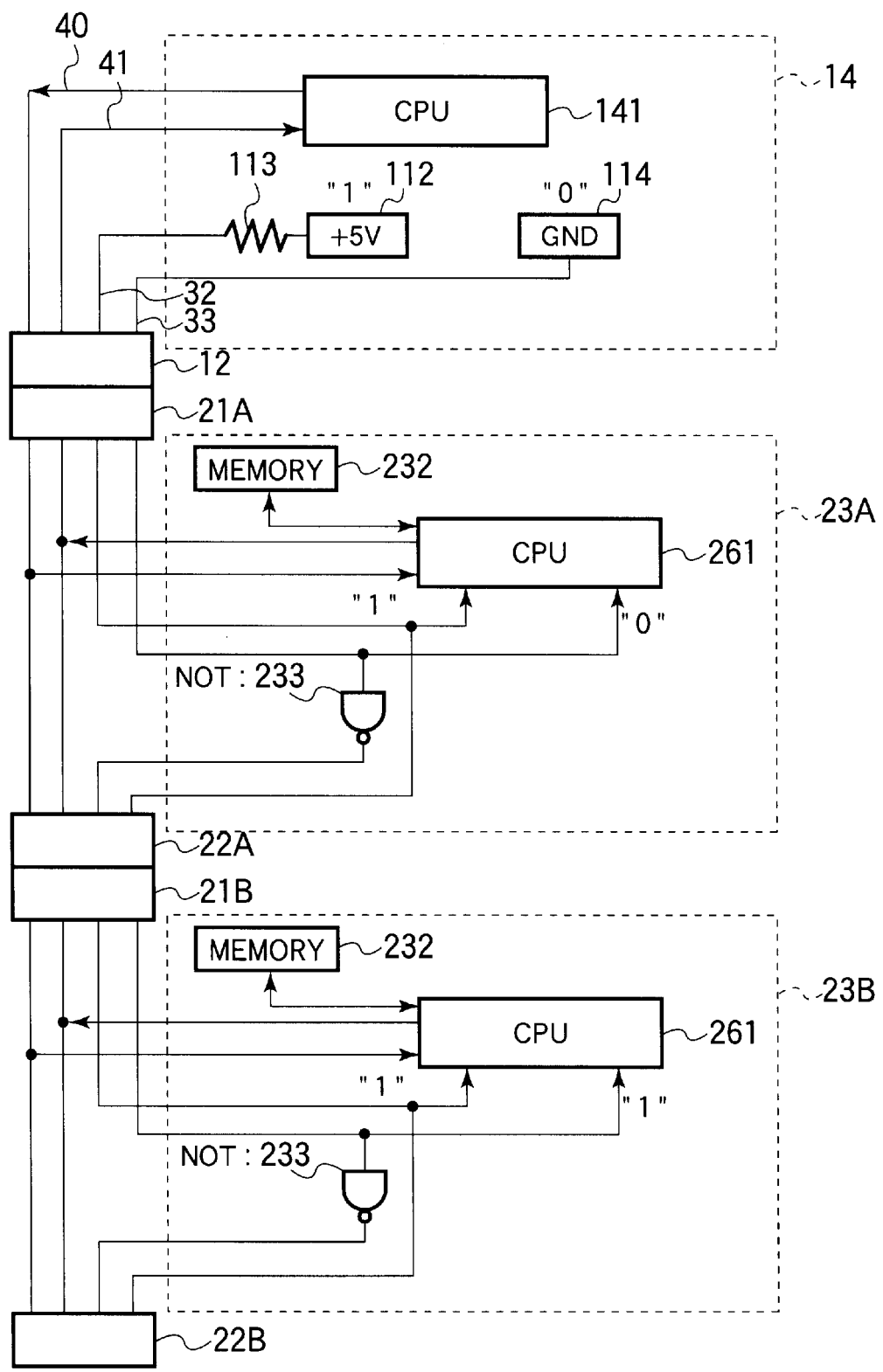
FIG. 2 is a block diagram illustrating the electrical connection of the first embodiment.

FIG. 2 is a block diagram that illustrates the electrical connection in the first embodiment. FIG. 2 shows only two option tray controllers 23A and 23B for convenience of explanation.

Referring to FIG. 2, the printer controller 14 includes a CPU 141, a 5V power supply 112, a pull-up resistor 113, and a GND 114. The CPU 141 outputs various signals over a serial transmit line 40 and receives various signals over a serial receive line 41. The location-assigning signal has two bits in the first embodiment. The 5V power supply 112 outputs a logic level "1" through the pull-up resistor 113, the logic level "1" serving as an upper bit 32 of the location-assigning signal. The GND 114 provides a logic level "0" that serves as a lower bit 33 of the location-assigning signal. The signals on the serial transmit line 40 and serial receive line 41, upper bit 32, and lower bit 33 are transmitted and received via the option tray interface connector 12.

The 5V power supply 112, pull-up resistor 113, and GND 114 form the signal generator 13 of FIG. 1.

The option tray controller 23A of the option tray 20A has a CPU 261, a memory 232, and a NOT gate 233.

The CPU 261 of each option tray communicates signals with the printer controller 141 over the serial transmit line 40 and serial receive line 41 through the upper interface connector 21A–21B, and performs various controls of the option tray. The serial transmit line 40 and serial receive line 41 connected to the upper interface connector 21A–21B are further directly connected to corresponding pins of the lower interface connector 22A–22B.

The upper bit 32 is directly supplied from the upper interface connector 21 to a lower bit-pin of the lower interface connector 22 while the lower bit 33 is supplied via the NOT gate 233 to an upper bit-pin. In other words, the lower bit is inverted and then the upper bit and the inverted lower bit are interchanged before they are fed to the lower interface connector 22.

The memory 232 of FIG. 2 serves as the memory section 24 of FIG. 1, while the CPU 261 and NOT gate 233 serve as the option location-determining section 25 of FIG. 1.

The option trays 20B–20D located lower than the 2nd option tray 20A are electrically connected in the same manner as the 2nd option tray 20A, the lower interface connector 22 of an upper option tray fitting to the upper interface connector 21 of a lower option tray.

FIG. 3 illustrates the location table stored in the memory 232.

Referring to FIG. 3, the memory 232 has the location table that lists the plurality of items of location LOCATION representative of the locations of the respective option trays 20A–20D. The CPU 261 of each option tray compares the upper bit 32 and lower bit 33 of the location-assigning signal with the plurality of items of location data LOCATION listed in the location table, thereby determining the location of the corresponding option tray.

{Location-assigning Operation}

FIG. 4 illustrates the transition of logical state of the location-assigning signal according to the first embodiment.

First, the signal generator 13 provides the upper bit 32 of a logic level "1" and lower bit 33 of a logic level "0" to the input port of the CPU 261 of the 2nd option tray 20A.

The lower bit 33 is inverted. Then, the upper bit 32 and the inverted lower bit 33 are interchanged and fed to the 3rd option tray 20B such that the upper bit 32 is now fed as the lower bit 33 and the inverted lower bit 33 is now fed as the upper bit 32. Thus, the logic state of the location-assigning signal supplied to the input of the CPU 261 of the 3rd option tray 20B through the lower interface connector 22A of the 2nd option tray is "11".

As mentioned above, the lower bit 33 is inverted and then the upper bit 32 and lower bit 33 are interchanged in each option tray, so that the third, fourth, and fifth option trays 20B, 20C, and 20D receive the location-assigning signal of logic states of "11," "01," and "00," respectively.

At the respective option tray, the CPU 261 compares the location-assigning signal with the plurality of items of location data LOCATION listed in the location table (FIG. 3) to determine the location of the corresponding option tray. For example, if an option tray receives the location-assigning signal of "11", then the location of the option tray is the 3rd from top.

{Modification of the First Embodiment}

The first embodiment has been described with respect to a case where the lower bit 33 is inverted by the NOT gate. Instead, the upper bit 32 may be inverted, in which case the inverted upper bit 32 is directed to the signal line of the lower bit and the lower bit not inverted is directed to the signal line of the upper bit.

FIG. 5 illustrates the location table according to the modification.

FIG. 6 illustrates the transition of logical state of the location-assigning signal.

Referring to FIG. 6, the logical state of the location-assigning signal supplied to the respective option tray are "01" for the 2nd tray, "11" for the 3rd tray, "10" for the 4th tray, and "00" for the 5th tray. The CPU 261 compares the location-assigning signal with the plurality of items of location data LOCATION listed in the location table to determine the actual location of the corresponding option tray.

As mentioned above, the logic state of the location-assigning signal is changed at each option tray and outputted to an immediately lower option tray. As opposed to the conventional apparatus, the first embodiment ensures that the locations of more than two option trays are identified.

Unlike the conventional art where, for example, a DIP switch is set to assign the location of the option tray, the locations of the respective option trays are determined wherever the option trays are inserted in the printer main body. This, prevents the users from forgetting to set the location of the option tray or erroneously setting the location of the option tray.

Although the first embodiment has been described with respect to four option trays 20A–20D, a larger number of bits of the location-assigning signal can be used to identify more option trays.

FIG. 7 illustrates a plurality of bits and locations of option trays represented by the plurality of bits.

Referring to FIG. 7, for example, the use of 3 bits allows six different locations to be represented and the use of 4 bits allows eight different locations to be represented. The example of 2-bit configuration corresponds to the example described with reference to FIG. 4. No. xx indicates the location of an option tray. At the respective option tray, the most significant bit is inverted and moved to the lowermost bit, and then the other bits are shifted higher by one bit. In other words, the entire pulse train is rotated after the most significant bit is inverted.

FIG. 8 illustrates the transition of logic level of the bits, for example, when the entire pulse train of the location-assigning signal having three bits is rotated.

Referring to FIG. 8, the second option 20A (No. 2) receives the location-signal having three bits of "001". At the second option 20A, the most significant bit is inverted and then the entire pulse train is rotated. Then, the rotated pulse train is outputted, so that the third option tray 20B (No. 3) receives the location-assigning signal having three bits of "011". Then, at the third option 20B, the most significant bit is inverted and then the entire pulse train is rotated. Then, the rotated pulse train is outputted, so that the fourth option tray 20C (No. 4) receives the location-assigning signal having three bits of "111". At the fourth option 20C, the most significant bit is inverted and then the entire pulse train is rotated. The rotated pulse train is then outputted, so that the fifth option tray 20D (No. 5) receives the location-signal having three bits of "110".

While the first embodiment has been described with respect to a case where only one bit is inverted, two or more bits may be inverted provided that a fraction of a plurality of bits is inverted.

{Operation for Determining Whether Option Trays are Present or Absent}

Figure 9:
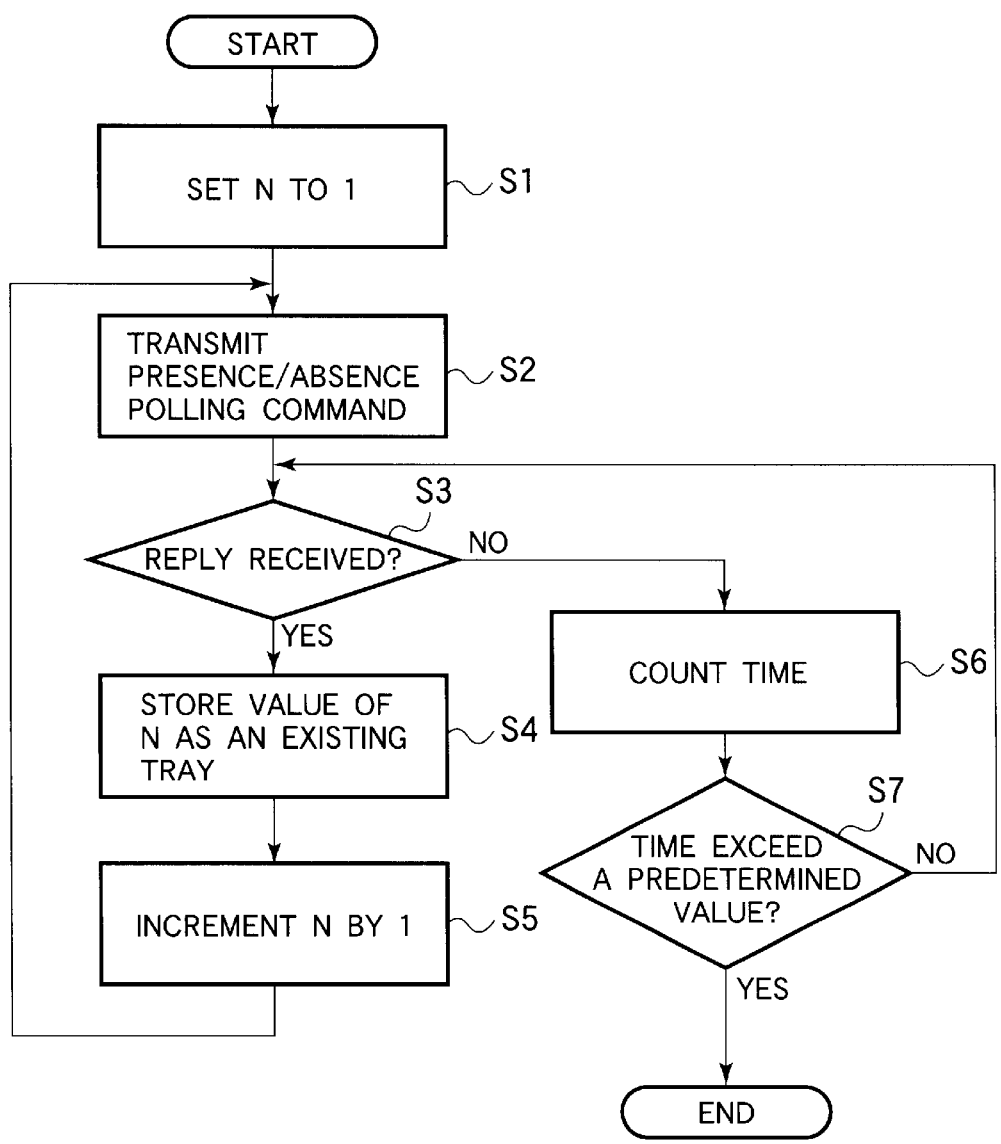
FIG. 9 is a flowchart for determining whether option trays have been attached to the printer, the flowchart illustrating the operation of the CPU of the printer controller.

FIG. 9 is a flowchart for determining whether option trays 20A–20D have been attached to the printer 10, the flowchart illustrating the operation of the CPU 141 of the printer controller 14.

After the respective option trays have been identified, the operation starts to determine whether option trays 20A–20D have been attached to the printer 10.

At step S1, the printer controller 14 sets an ID number N to an initial value or 1, the ID number being used to inquire a particular option tray.

At step S2, the printer controller 14 issues a presence/absence polling command to all of the option trays 20A–20D over the serial transmit line 40. Then, a check is made at step S3 to determine whether a reply is received from any one of the option trays 20A–20D. If the answer at step S3 is NO, then a timer, not shown, starts to count time at step S6 and a check is made at step S7 to determine whether time has elapsed beyond a predetermined length of time. If the answer is NO at step S7, then the program jumps back to step S3. Steps S3, S6, and S7 are repeated until the time has elapsed beyond the predetermined length of time. If the answer is YES at step S7, it is determined that an option tray corresponding to the ID number N does not exist, and the program ends.

If the answer is YES at step S3, then it is determined at step S1 that there exists an option tray corresponding to the ID number N, and the print controller 14 stores the value of the ID number N as an existing option tray. Then, at step S5, the ID number N is incremented by 1 and the program loops back to step S2.

Figure 10:
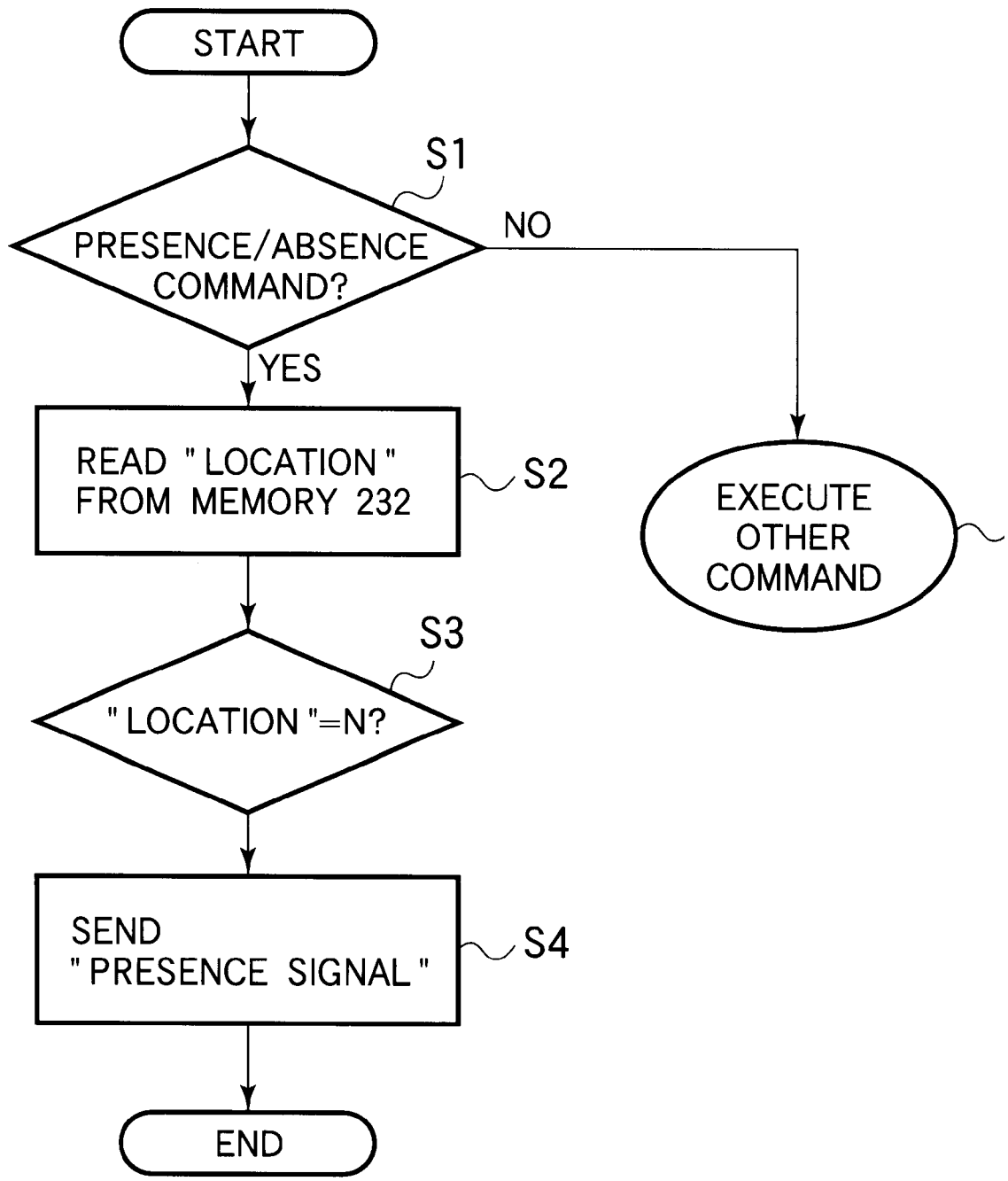
FIG. 10 is a flowchart for checking whether option trays have been attached to the printer, the flowchart illustrating the operation of the CPU of the option tray.

FIG. 10 is a flowchart for checking whether option trays 20A–20D have been attached to the printer 10, the flowchart illustrating the operation of the CPU 261 of one of the option trays by way of example.

Upon receiving a command from the printer controller 14, the CPU 261 of the respective option tray starts to analyze the command. That is, at step S1, a check is made to determine whether the received command is the presence/absence polling command. If the answer is YES at step S1, then the CPU 261 reads at step S2 the location data LOCA- TION stored in the memory 232, the location data LOCATION having been assigned by the location-assigning operation previously described with reference to FIG. 4. At step S3, a check is made to determine whether LOCATION=N. If the answer is NO at step S3, then the program ends. If the answer is YES at step S3, the CPU 261 sends the "PRESENCE signal" to the printer controller 14 at step S4, thereby informing the printer controller 14 that there exists an option tray having the ID number N. In other words, only one option tray having location data LOCATION that matches the ID number N sends the "PRESENCE signal" to the printer controller 14.

{Operation for Checking Option Tray Status}

Over the serial transmit line 40, the printer controller 14 outputs an option status polling command and a tray-specifying signal that specifies an option tray to be polled. Over the transmit line 40, each of the option trays receives the option status polling command and the tray-specifying signal. An option tray sends its status data if the received tray-specifying signal matches the location data LOCATION stored in the option trays. The status data includes information regarding print medium held in the option tray such as size, type, orientation, and presence/absence of the print medium, and is sent to the printer controller 14 over the receive line 41 under the option status polling command. The printer controller 14 receives the status data from each of the option trays over the receive line 41, and stores it.

If an option tray has location data LOCATION stored therein that does not match the received tray-specifying signal, the CPU 261 of the option tray simply ignores the received tray-specifying signal.

{Printing Operation}

When the printer controller 14 receives a print command from a host apparatus, the print controller 14 determines, based on the status data stored therein, an option tray that matches the printing conditions preset by the user. Then, over the transmit line 40, the printer controller 14 outputs the location-specifying signal and a paper-feed command to the determined option tray. If the location-specifying signal matches the location data LOCATION stored in the option tray, the option tray feeds the print medium therefrom to the printer 10 in response to the paper-feed command. In this manner, the print medium is fed to the printer 10 from a specified option tray.

Second Embodiment

A second embodiment is characterized in the following aspects. The printer 10 provides a predetermined number of pulses to the option tray immediately below the printer 10 and each of the following option trays sends more or less pulses to an immediately lower option tray than in the pulses that the option tray receives from an immediately upper option tray. In other words, the respective option trays can determine their locations by the number of pulses received.

{Construction}

Figure 11:
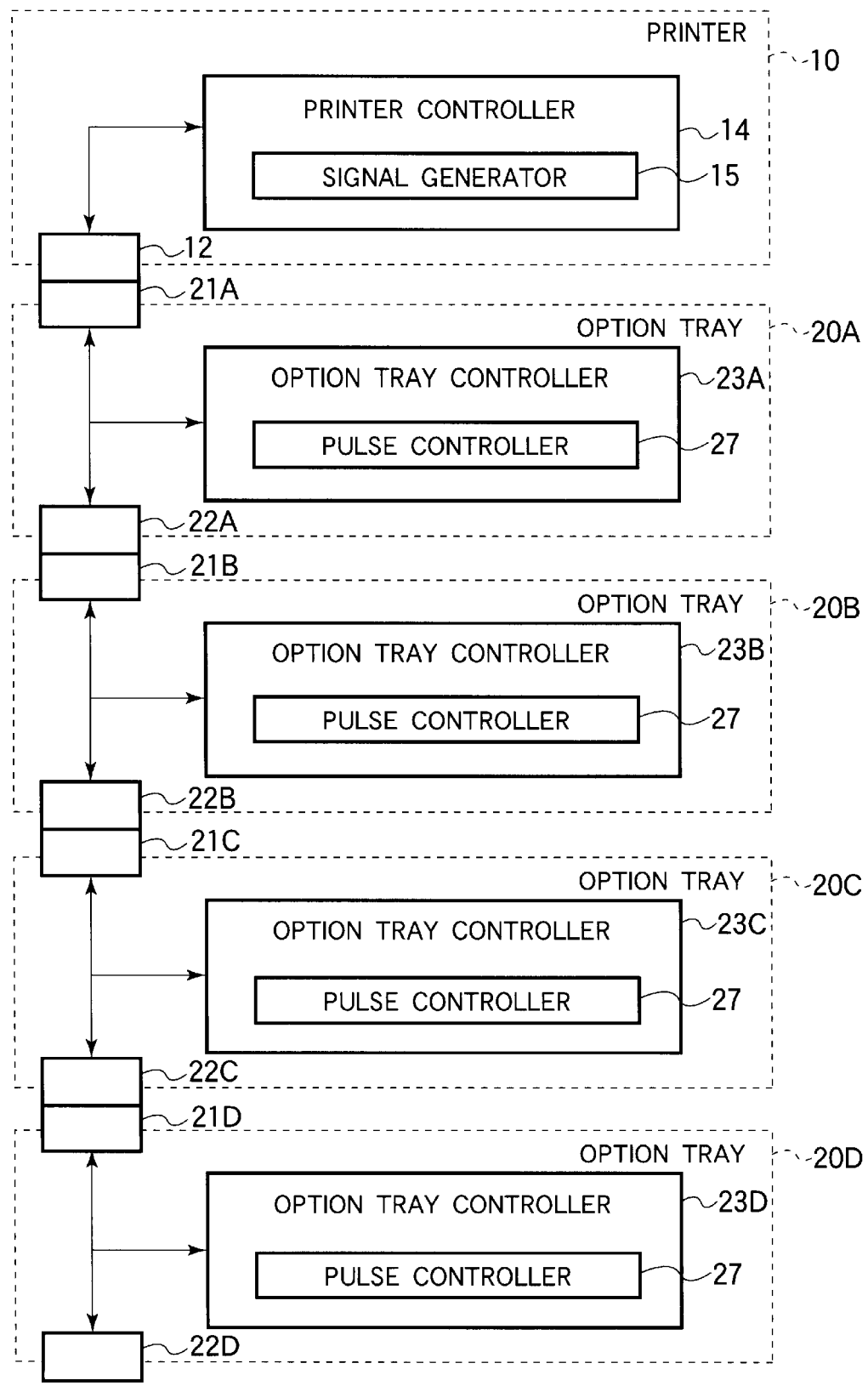
FIG. 11 illustrates a general construction of an option-identifying system.

FIG. 11 illustrates a general construction of an option-identifying system according to the second embodiment.

Referring to FIG. 11, the option-identifying system includes a printer 10 and four option trays 20A–20D just as in the first embodiment.

The printer 10 has a printer controller 14 and an option tray interface connector 12. The printer controller 14 operates in the same manner as the print controller 14 in the first embodiment. The printer controller 14 has a signal generator 15 that outputs a location-assigning signal having a predetermined number of pulses.

Each of the four option trays 20A–20D is provided with an upper interface connector 21, a lower interface connector 22, and an option tray controller 23. The option tray controller has a pulse controller 27 therein. The four option trays 20A–20D are stacked and adjacent option trays are electrically connected to each other such that adjacent option trays communicates with one another through the upper and lower interface connectors 21 and 22 and each option tray communicates with the printer controller 14 through the upper interface connector 21.

The pulse controller 27 has an item of data, i.e., location data LOCATION, which describes the location of the option tray in terms of the number of pulses. The pulse controller 27 determines the location of the corresponding option tray from the number of pulses of location-assigning signal received from the printer 10 or from an immediately upper option tray. Then, the pulse controller 27 adds a predetermined number of pulses to the received pulses of location-assigning signal or subtracts a predetermined number of pulses from the received pulses of location-assigning signal, and then outputs the location-assigning signal having the increased or decreased pulses to the next lower option tray.

The respective option trays are of the same construction. The configuration of the second embodiment differs from the first embodiment in the location-assigning means. The other configuration of the second embodiment including a paper feeding operation is much the same as the conventional apparatus the first embodiment.

Figure 12:
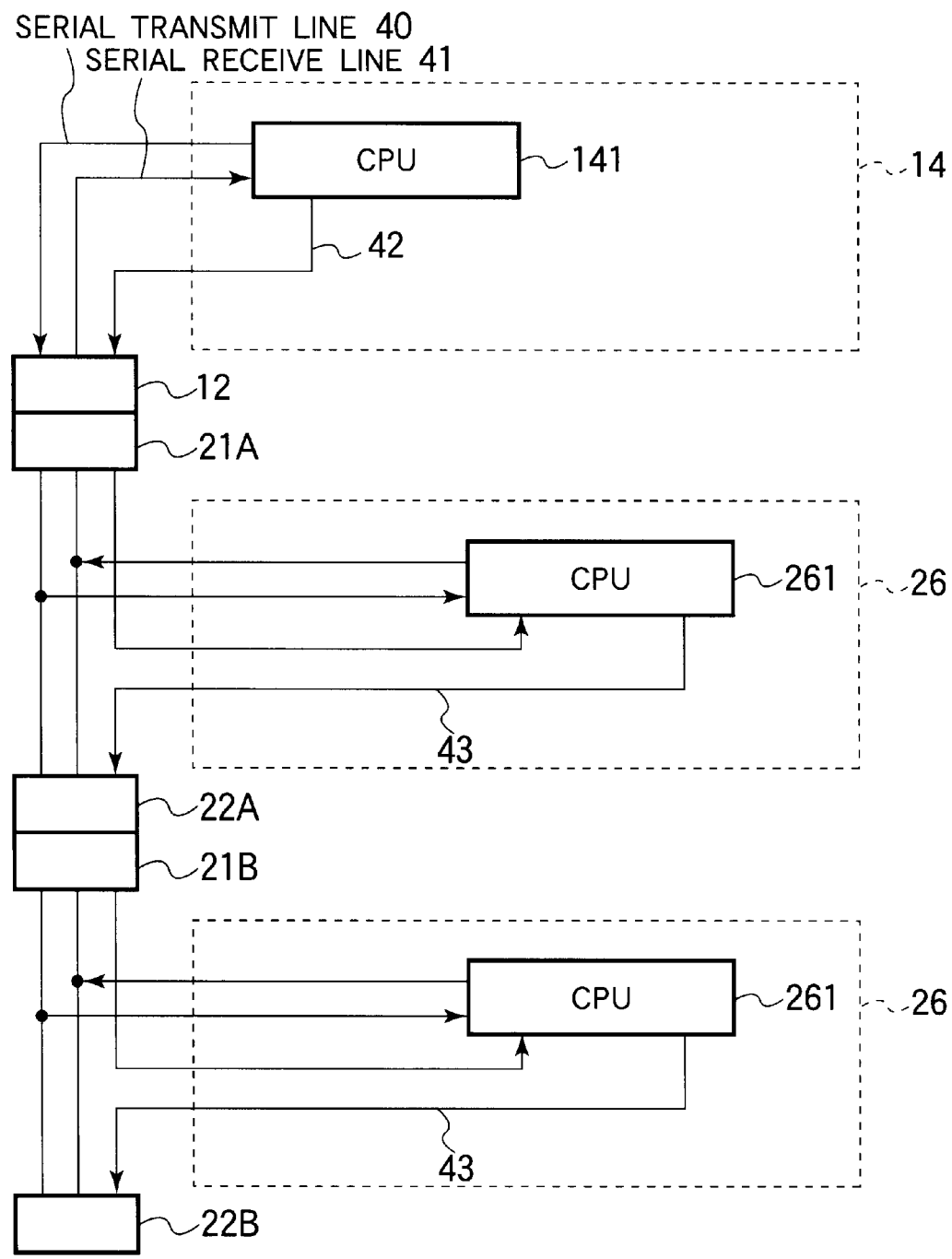
FIG. 12 is a block diagram illustrating the electrical connection of the second embodiment.

FIG. 12 is a block diagram illustrating the electrical connection of the second embodiment.

The printer controller 14 includes a CPU 141 that serves as the generator 15 and generates a tray-specifying signal. The CPU 141 outputs various signals over a serial transmit line 40 and receives various signals over a serial receive line 41. The CPU 141 provides a location-assigning signal 42 to the option tray interface connector 12. The serial transmit line 40 and serial receive line 41 are also connected to the option interface connector 12.

The option controller of the option tray 20A, located immediately under the printer 10, has a CPU 261 connected to an upper interface connector 21A which in turn is fitted to the option tray connector 12.

The CPUs 261 of the respective option trays 20A–20D perform various controls of the option trays 20A–20D and play a role of the pulse controller 27 of FIG. 11. Over the serial transmit line 40 and serial receive line 41, each of the CPUs 261 of the option trays 20A–20D communicates various signals with the printer 10 as well as with the immediately upper and lower option trays. The serial transmit line 40 and serial receive line 41 directly connect between corresponding pins of the upper and lower interface connectors 21 and 22 of the respective option tray.

Each CPU 261 receives the location-assigning signal 42 from the printer controller 14 or an immediately upper option tray. The CPU 261 produces a location-assigning signal 43 by modifying the received location-assigning signal 42, and sends the location-assigning signal 43 to an immediately lower interface connector 22.

The option trays 20B–20D located lower than the option tray 20A are electrically connected in the same manner as the option tray 20A. That is, the lower interface connector 22 of an upper option tray fits to the upper interface connector 21 of a lower option tray.

{Location-assigning Operation #1}

First, the operation of the second embodiment will be described with respect to a case in which each option tray sends to an immediately lower option tray the location-assigning signal 43 having one less pulse than in the location-assigning signal 42 it receives from an immediately upper option tray.

Figure 13:
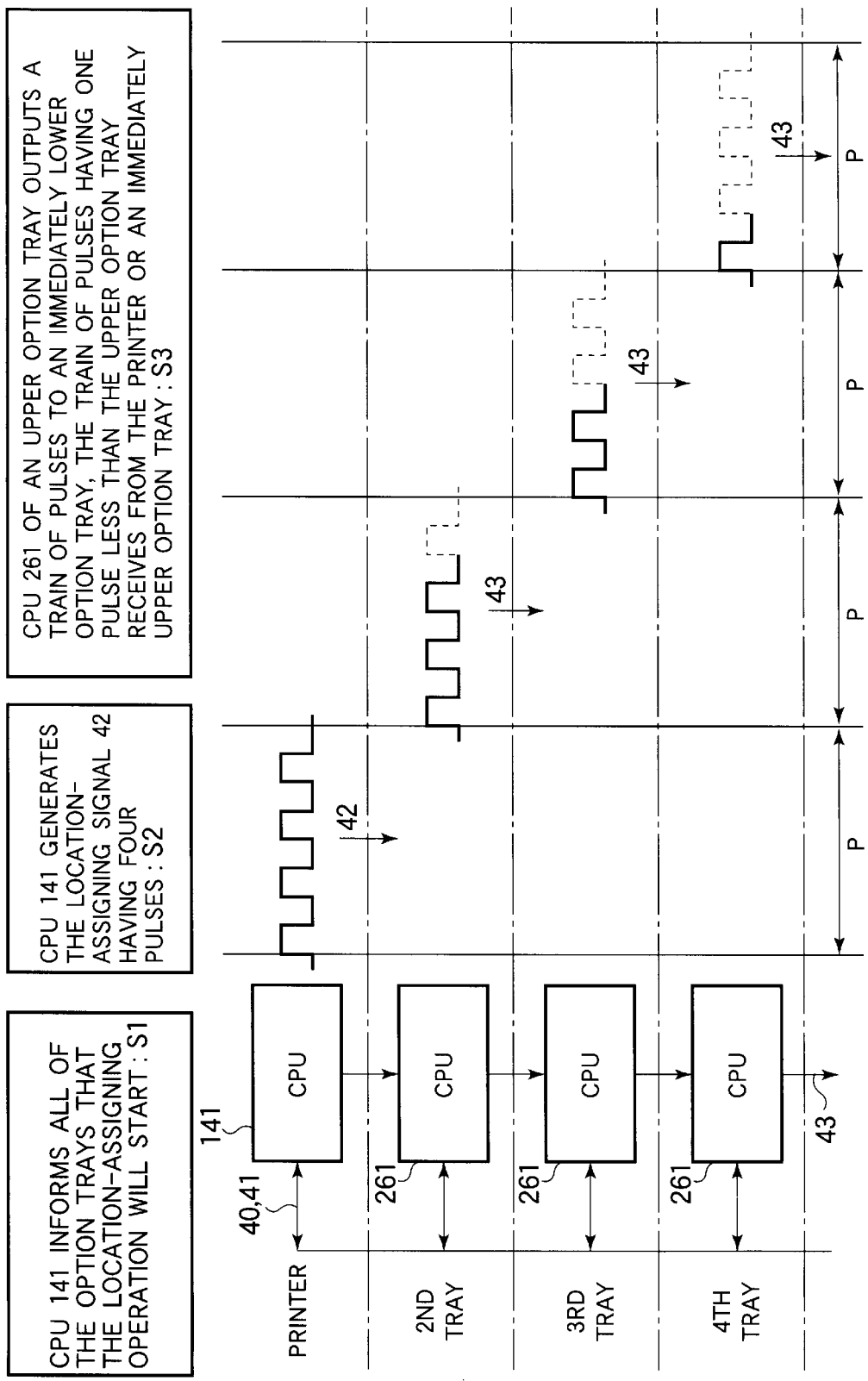
FIG. 13 illustrates a location-assigning operation of the second embodiment.

FIG. 13 illustrates a location-assigning operation of the second embodiment.

In this example, the signal generator 15 of the printer controller 14 outputs a location-assigning signal 42 having four pulses. The pulse controller 27 counts the number of pulses received from an upper location to determine the location of the corresponding option tray. If the number of pulses received is 4, then it is determined that the option tray is the 2nd option tray 20A. Similarly, if the number of pulses received is 3, the option tray is the third option tray 20B. The pulse controller 27 outputs the location-assigning signal 43 to an immediately lower option tray, the location-assigning signal 43 having one less pulse than in the location-assigning signal 42 that the controller 27 receives from an immediately upper option tray.

Upon, for example, power on, the CPU 141 of the printer controller 14 starts the location-assigning operation #1_ in order to assign a specific location to each option tray.

First, at step S1, by transmitting signals under a predetermined protocol over the serial transmit line 40, the CPU 141 informs all of the CPUs 261 of the option trays 20A–20D that the location-assigning operation will start.

At step S2, the CPU 141 generates the location-assigning signal 42, i.e., four pulses having a predetermined pulse width.

At step S3, when the CPU 261 is informed that the location-assigning operation has started, the CPU 261 starts to monitor elapsed time from the rising edge of the first pulse of the location-assigning signal 42. As soon as the pulses of the location-assigning signal 42 have been received from the printer controller 14, the CPU 261 of the option tray 20A starts to output the first pulse of a train of pulses (i.e., location-assigning signal 43) to the option tray 20B. The location-assigning signal 43 outputted from the option tray 20A has one less pulse than in the pulse train that the option tray 20A receives from the printer 10.

Each of the CPUs 261 determines the location of the corresponding option tray on the basis of the number of pulses (i.e., location-assigning signal 42) received during a predetermined time length P. For example, if a CPU 261 receives four pulses, then it is determined that the corresponding option tray is at a location for the option tray 20A. If a CPU 261 receives three pulses, then it is determined that the corresponding option tray is at a location for the option tray 20B. If the CPU 261 receives two pulses, then it is determined that the corresponding option tray is at a location for the option tray 20C.

At the end of a certain time period, i.e., 4×P, under a predetermined protocol over the serial transmit line 40, the CPU 141 of the printer controller 14 informs all of the CPUs 261 that the location-assigning operation has been completed.

{Location-assigning Operation #2}

Figure 14:
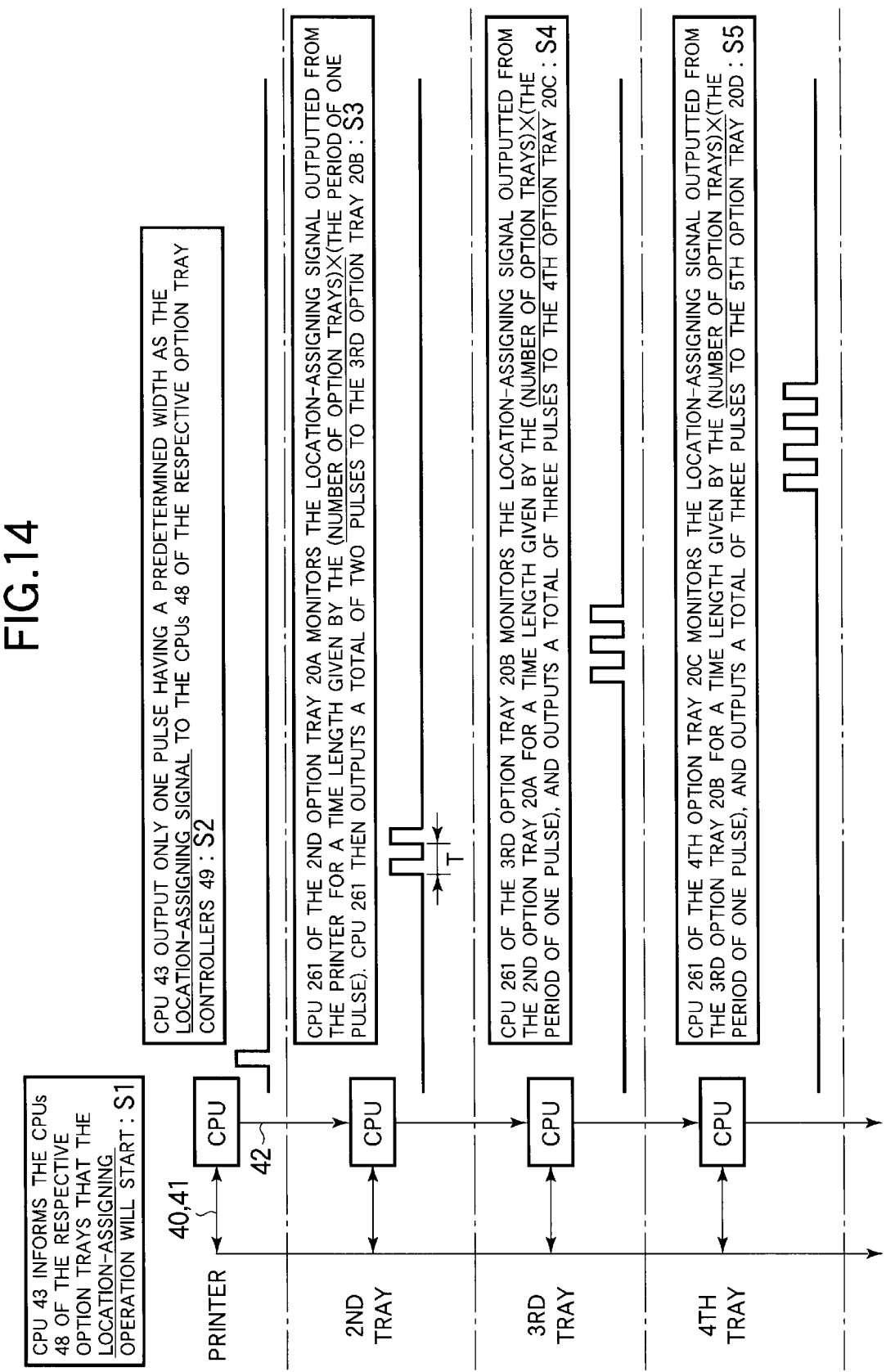
FIG. 14 illustrates a modification of the location-assigning operation of the second embodiment.

FIG. 14 illustrates a modification of the location-assigning operation #1 of the second embodiment.

The CPU 141 of the printer controller 14 activates a location-assigning operation #2, for example, when the printer 10 is powered on.

At step S1, over the serial transmit line 40 under a predetermined protocol, the CPU 141 informs the CPUs 261 of the respective option trays that the location-assigning operation #2 will start.

At step S2, the CPU 141 outputs only one pulse having a predetermined width as the location-assigning signal to the CPUs 261 of the respective option tray controllers 49.

At step S3, the CPU 261 of the 2nd option tray 20A counts the pulses of the location-assigning signal 42 outputted from the printer 10. A built-in timer, not shown, starts to count an elapsed time from the rising edge of the received pulse of the location-assigning signal 42. When the timer has counted an elapsed time equal to a time length P, i.e., the number of option trays 20A–20D times the pulse repetition period, the CPU 261 outputs the location-assigning signal 43 having two pulses to the 3rd option tray 20B.

At step S4, the CPU 261 of the 3rd option tray 20B counts the pulses of the location-assigning signal outputted from the 2nd option tray 20A. A built-in timer, not shown, of the 3rd option tray 20B starts to count an elapsed time from the leading edge of the first pulse of the location-assigning signal 42 received from the 2nd option tray 20A. When the timer has counted the elapsed time equal to the number of option trays times the pulse repetition period, the CPU 261 of the 3rd option tray 20B outputs the location-assigning signal 43 having three pulses to the 4th option tray 20C.

As mentioned above, each option tray outputs to an immediately lower option tray a location-assigning signal having one more pulses than in the location-assigning signal that the option receives from an immediately upper option tray.

After a sufficient time, i.e., (one pulse repetition period T)×(the number of option trays)×(the number of option trays), the CPU 141 of the printer controller 14 informs the CPUs 261 of all of the option trays 20A–20D that the location-assigning operation #2 has been completed.

{Location-assigning Operation #3}

Next, the location-assigning operation of the second embodiment will be described with respect to a case in which each option tray sends to an immediately lower option tray the location-assigning signal 42 having one more pulse than in the location-assigning signal 42 it receives from an immediately upper option tray.

Figure 15:
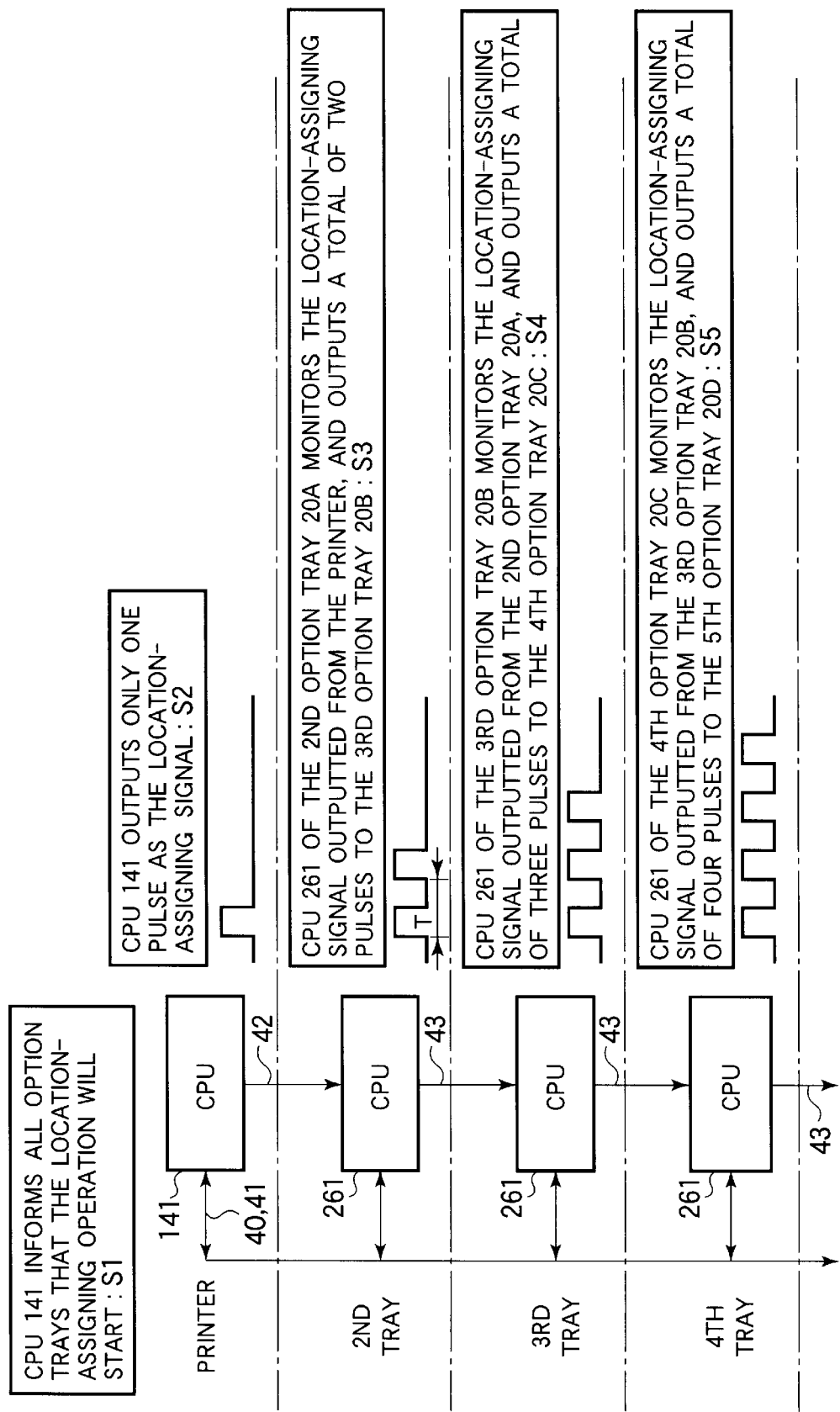
FIG. 15 illustrates a location-assigning operation of the second embodiment.

FIG. 15 illustrates another modification of the location-assigning operation #1 of the second embodiment.

Figure 16:
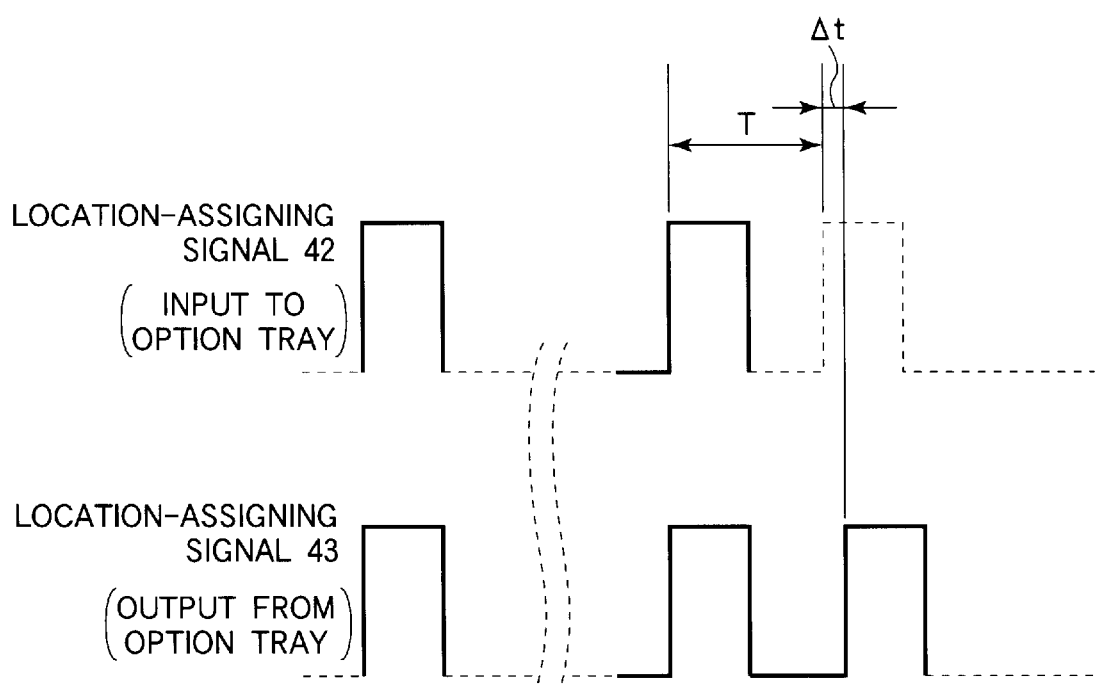
FIG. 16 is a timing chart that shows the time relation between the input location-signal and output location signal.
Figure 17:
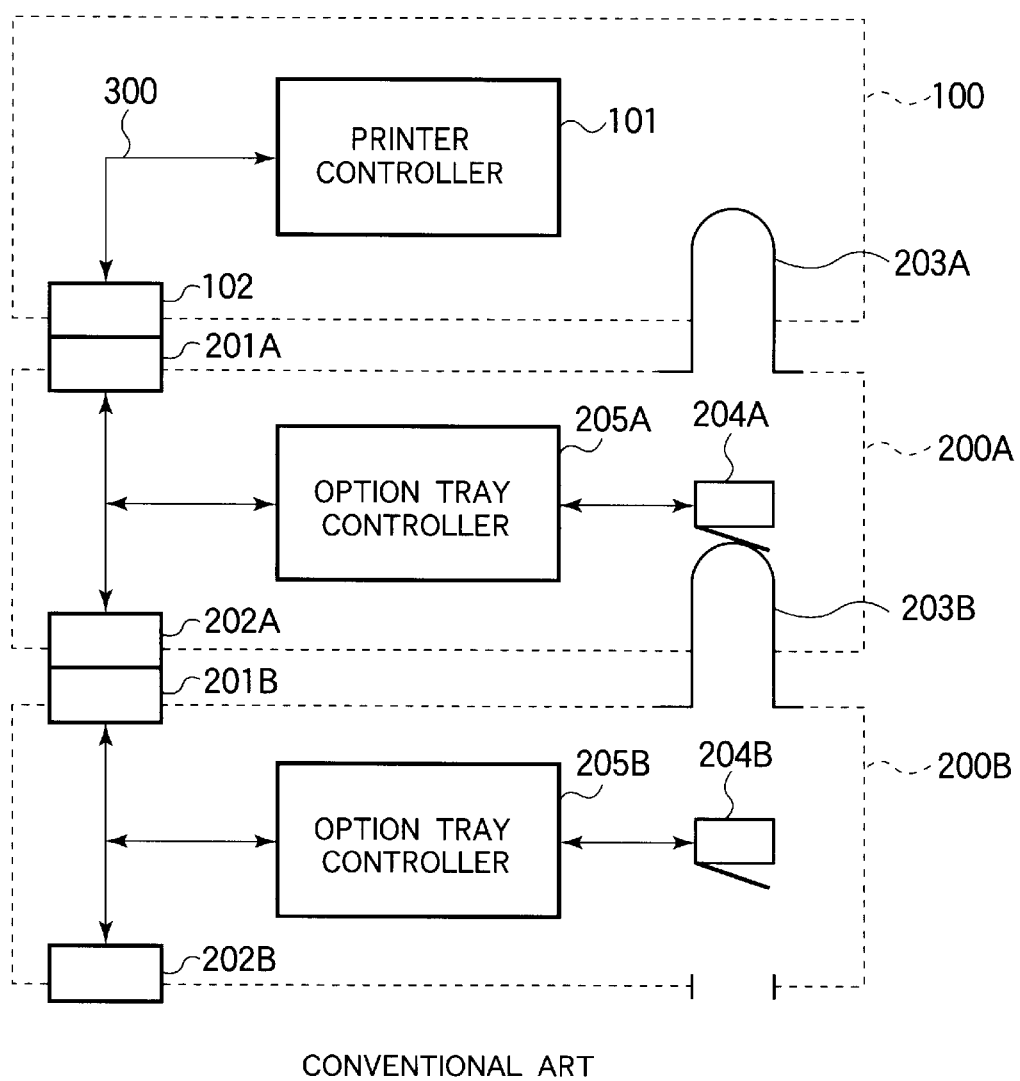
FIG. 17 illustrates conventional option trays when they are inserted into a printer.
Figure 18:
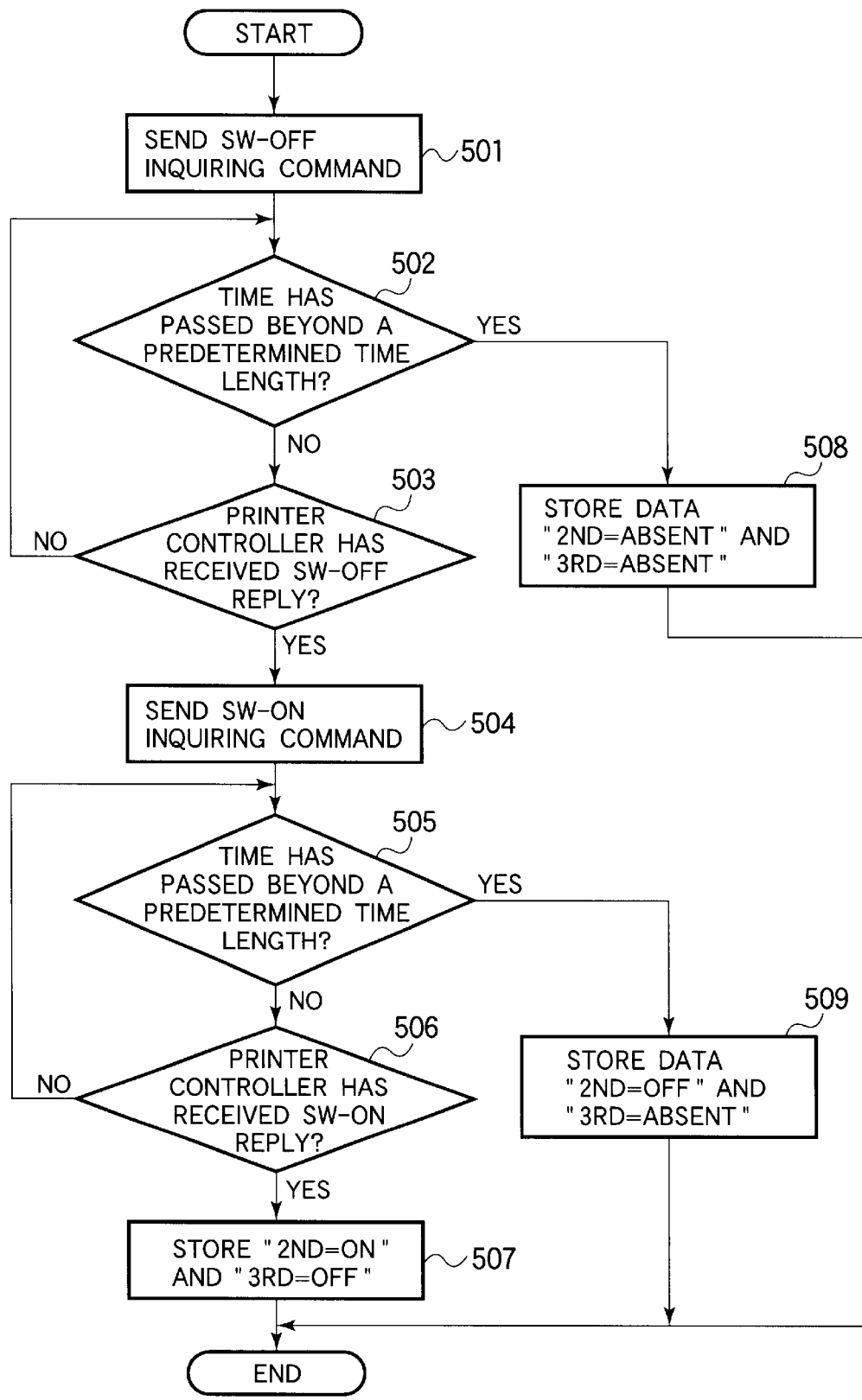
FIG. 18 is a flowchart showing the operation of the conventional printer controller in which a check is made to determine whether option trays are present or absent.
Figure 19:
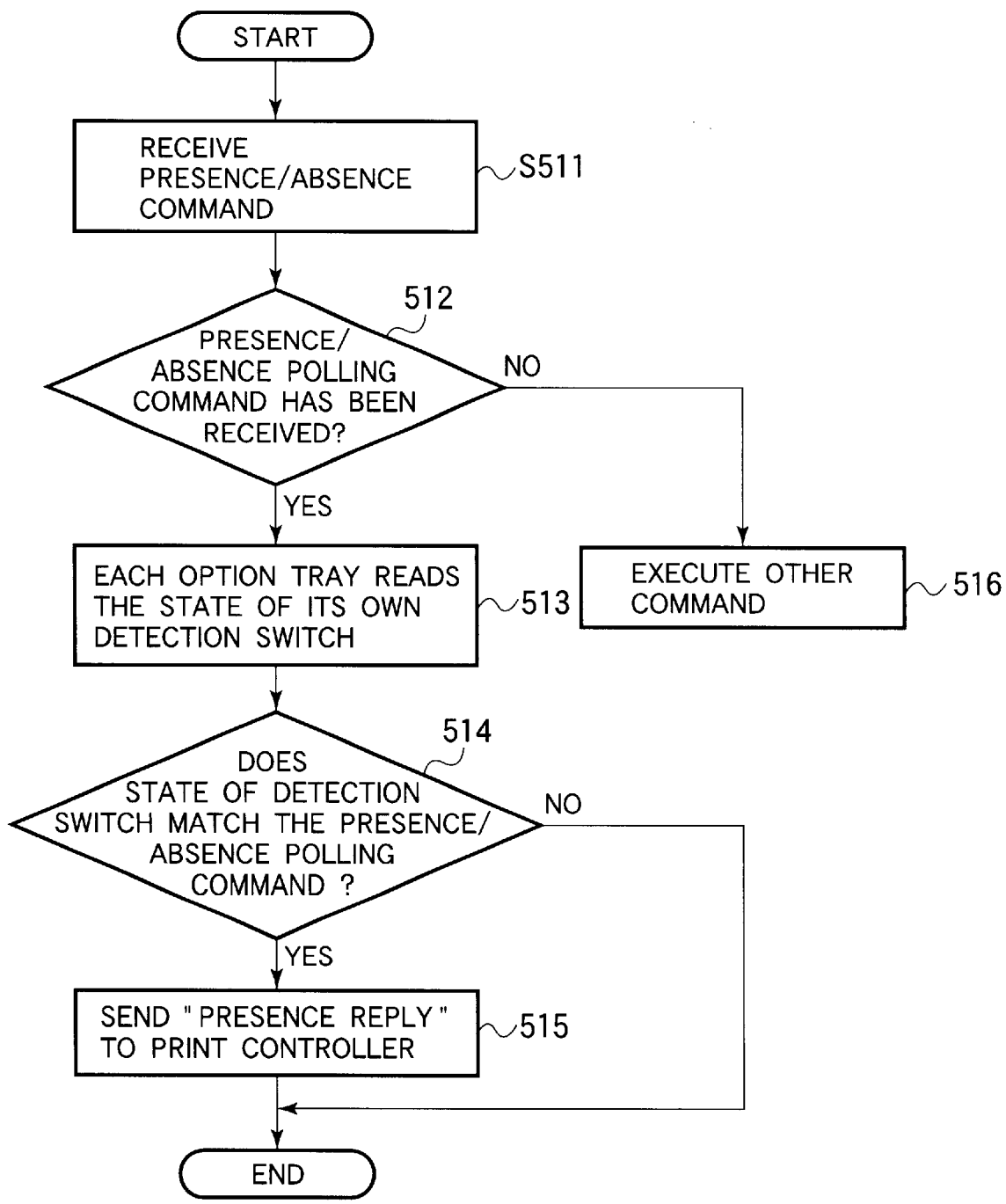
FIG. 19 is a flowchart showing the operation in which the conventional printer controller acquires the status of the option trays.

FIG. 16 is a timing chart that shows the time relation between the input location-signal and the output location-assigning signal.

Upon, for example, power on, the CPU 141 of the printer controller 14 starts a location-assigning operation #3 for determining the locations of the option trays 20A–20D.

First, at step S1, by transmitting signals under a predetermined protocol over the serial transmit line 40, the CPU 141 informs all of the CPUs261 of the option trays 20 that the location-assigning operation #3 will start.

As shown at step S2, the CPU 141 outputs only one pulse as the location-assigning signal having a predetermined pulse width.

As soon as the location-assigning operation #3 has started, the CPU 261 of the 2nd option tray 20A monitors, at step S3, the location-assigning signal 42 outputted from the printer 10. The CPU 261 starts to count the number of pulses of the location-assigning signal 42 received from the printer 10, while at the same time starting to output pulses of the location-assigning signal 43. As shown in FIG. 16, the CPU 261 outputs a pulse of the location-assigning signal 43 to an immediately lower option tray at the same timing as it receives a pulse of the location-assigning signal 42 from an immediately upper option tray. When the CPU 261 does not receive a pulse for a period equal to a pulse repetition period T plus a predetermined time length Δt from the leading edge of an input pulse, then the CPU 261 outputs one pulse to an immediately lower option tray and then stops outputting a pulse thereafter. In other words, the CPU 261 outputs one more pulse than in the location signal it receives from an immediately upper option tray. The location-assigning signal 43 inputted to the CPU 261 has the same pulse width as the location-assigning signal 42 outputted from the CPU 261.

Likewise, as shown at steps S4 and S5, the respective option trays 20A–20D know their locations in terms of the number of pulses of the received location-assigning signal 42.

In order to detect the end of the location-assigning signal, a timer (not shown) of the CPU 261 of the 2nd option tray 20A monitors elapsed time from the leading edge of the pulse of the received location-assigning signal. If the CPU 261 does not detect the leading edge of a following pulse for a certain length of time after the leading edge of a preceding pulse, the CPU 261 outputs a pulse as a final pulse of the location-assigning signal 43 and stops outputting a pulse thereafter. The certain length of time is a time period equal to a predetermined length of time Δt plus a pulse repetition period T of the location-assigning signal 42. This implies that the CPU 261 outputs a total of two pulses to the 3rd option tray 20B, i.e., a pulse train having one more pulse than the location-assigning signal received from an upper location.

In this manner, the location-assigning signal is sent through the option trays 20A and 20B to the final option tray 20D in a predetermined length of time. Then, the CPU 141 sends a signal over the serial transmit line 40 under a predetermined protocol, thereby informing the CPUs 261 of all of the option tray controllers that the location-assigning operation #3 has been completed.

As mentioned above, an option tray sends more pulses to a lower location than the option tray receives from an upper location. The option trays 20A–20D each receive the location-assigning signal having a certain number of pulses from the upper location while at the same time outputting the location-assigning signal having less pulses to the lower location. If no pulse is received from the upper location for a predetermined length of time (i.e., Δt+T) after the reception of the last pulse, then the option tray outputs one pulse and then stops outputting a pulse thereafter. This effectively reduces the time required for performing the location-assigning operation.

Just as in the first embodiment, the memory 232 of the respective option tray has a location table that lists the locations of option trays and a plurality of items of location data LOCATION that describe corresponding locations.

The CPU 261 of each option tray receives the location-assigning signal and compares the location-assigning signal with the plurality of items of multi-bit data, thereby determining the location of the corresponding option tray.

{Operation of Acquiring the Status of the Option Tray}

Over the serial transmit line 40, the printer controller 14 outputs tray-specifying signal that specifies an option tray to be polled and an option-status polling command. The option trays 20A–20D receive the tray-specifying signal and option-status polling command over the serial transmit line 40. If the received tray-specifying signal does not match the location data LOCATION stored in the option tray, the CPU 261 of the option tray simply ignores the tray-specifying signal. If the received tray-specifying signal matches the location data LOCATION stored in the option tray, the option tray sends status data to the printer controller 14 over the receive line 41 under the predetermined protocol. The status data describes the presence/absence, the type, and the size of the print medium accommodated in the option tray. The printer controller 14 stores the status data received from the option tray over the receive line 41.

{Printing Operation}

Upon receiving a print command from a host apparatus, the print controller 14 determines, based on the status data, an option tray that meets the conditions selected by the user. Then, over the serial transmit line 40, the printer controller 14 sends the location-specifying signal and paper-feed command to the corresponding option tray. The option tray receives the location-specifying signal and paper-feed command over the serial transmit line 40. If the location-specifying signal matches the location data LOCATION stored in the option tray, the option tray feeds the print medium therefrom in accordance with the paper-feed command. In this manner, a page of print medium is fed from a desired option tray to the printer 10. If the location-specifying signal does not match the location data LOCATION stored in the option tray, then the option tray simply ignores the paper-feed command.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An option-identifying system for identifying locations of a plurality of options that are electrically connected in cascade and mounted to a main body such that the options are attachable to and detachable from the main body:

wherein the main body comprises a signal generating section that outputs a location-assigning signal having a plurality of bits to a first one of the plurality of options;

wherein each of the plurality of options comprises:
　a data-storing section that stores the locations of the plurality of options and corresponding location data that describe the locations; and
　a location-identifying section that receives the location-assigning signal and compares the received location-assigning signal with the location data to identify a location of a corresponding option;

wherein the location-identifying section inverts one of the plurality of bits of the received location-assigning signal, then rotates the plurality of bits of the location-assigning signal after inversion of the most significant bit, and finally outputs the location-assigning signal after rotation to a following option.

2. The option-identifying system according to claim 1, wherein the location-identifying section inverts a most significant bit of the plurality of bits.

3. The option-identifying system according to claim 1, wherein the location-identifying section inverts a least significant bit of the plurality of bits.

4. An option-identifying system for identifying locations of a plurality of options that are electrically connected in cascade and mounted to a main body such that the options are attachable to and detachable from the main body:

wherein the main body comprises a signal generating section that outputs a location-assigning signal having a plurality of bits to a first one of the plurality of options;

wherein each of the plurality of options comprises:
　an data-storing section that stores the locations of the plurality of options and corresponding location data that describe the locations; and
　a location-identifying section receives the location-assigning signal and compares the received location-assigning signal with the location data to identify a location of a corresponding option;

wherein the location-identifying section outputs the location-assigning signal having a number of bits different from the received location-assigning signal to a following option.

5. The option-identifying system according to claim 4, wherein the option identifying section outputs the location-assigning signal having one more bit than in the received location-assigning signal to the following option.

6. The option-identifying system according to claim 4, wherein the option identifying section outputs the location-assigning signal having one less bit than in the received location-assigning signal to the following option.

7. The option-identifying system according to claim 4, wherein the option identifying section outputs each of bits of the location-assigning signal to the following option at the same timing as each of the bits of the location-assigning signal is received;

wherein when the option identifying section outputs does not receive a pulse for a pulse repetition period plus a predetermined time length from the leading edge of an input pulse, then the option identifying section outputs one pulse to an immediately lower option tray and then stops outputting a pulse thereafter.

* * * * *